Jan. 29, 1963 A. S. JANKOWSKI 3,075,562
LEAD WIRE INSERTING APPARATUS
Filed Jan. 30, 1961 12 Sheets-Sheet 1

INVENTOR.
ALFRED S. JANKOWSKI
BY David M. Keay
AGENT.

Jan. 29, 1963  A. S. JANKOWSKI  3,075,562
LEAD WIRE INSERTING APPARATUS
Filed Jan. 30, 1961  12 Sheets-Sheet 4
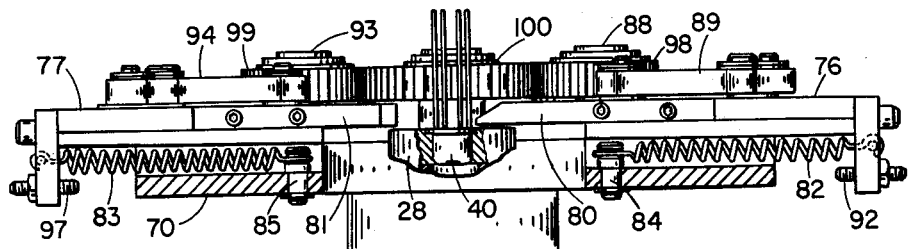
FIG. 5
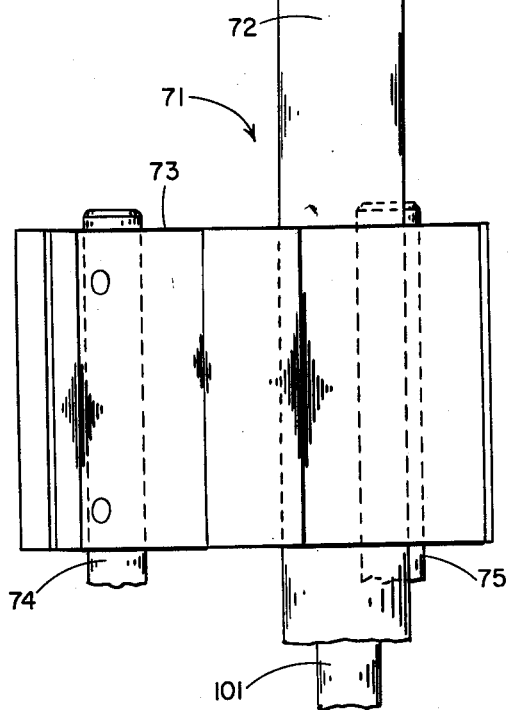
INVENTOR.
ALFRED S. JANKOWSKI
BY
David M. Keay
AGENT.

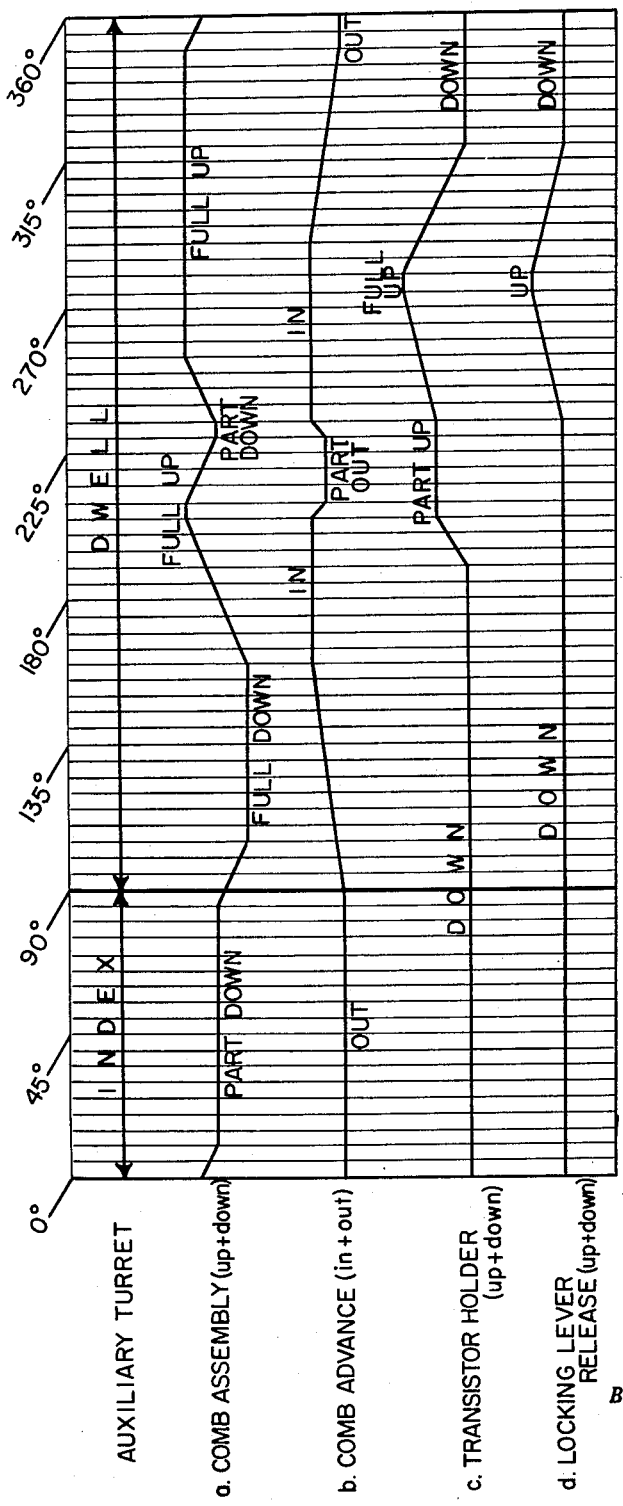

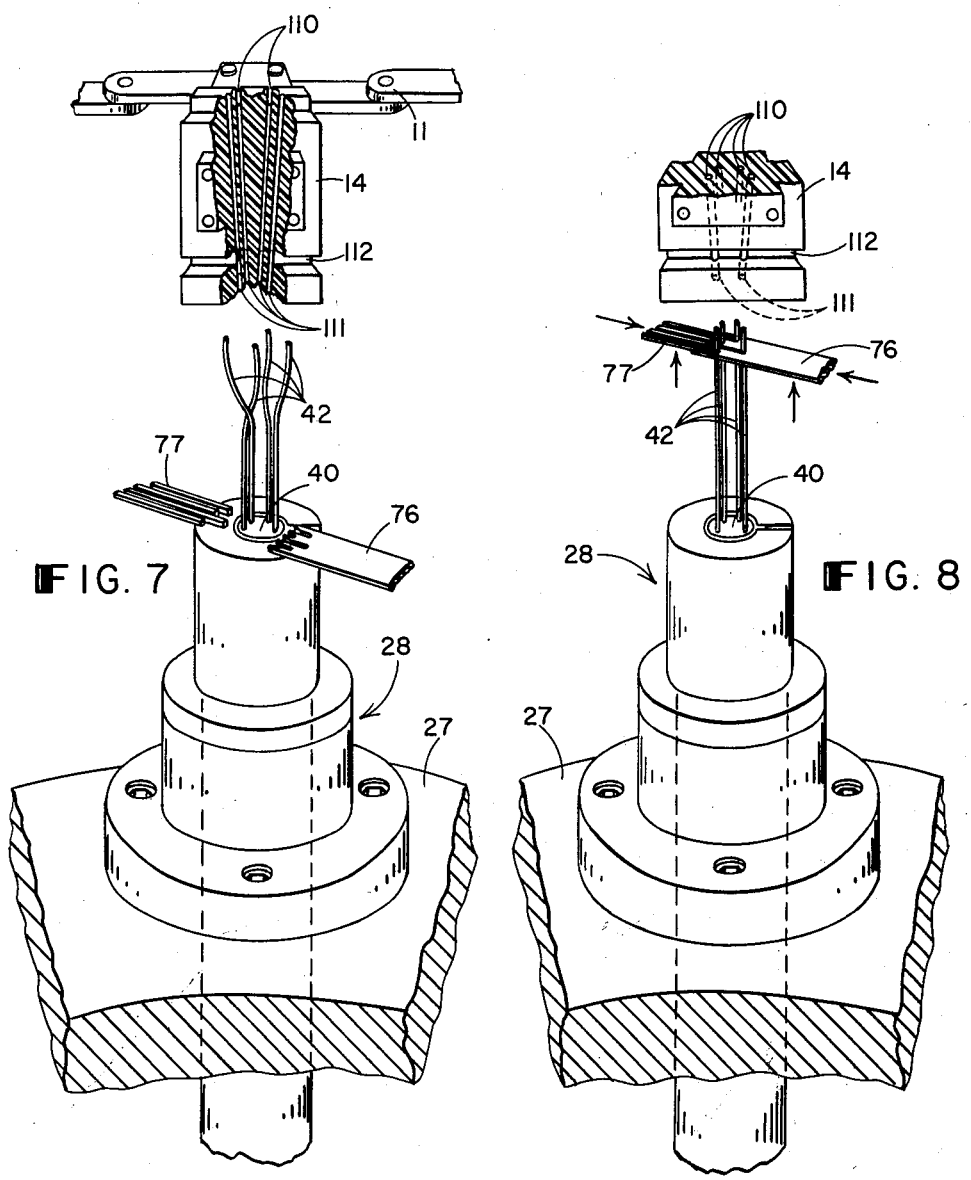

Jan. 29, 1963  A. S. JANKOWSKI  3,075,562
LEAD WIRE INSERTING APPARATUS
Filed Jan. 30, 1961  12 Sheets-Sheet 7
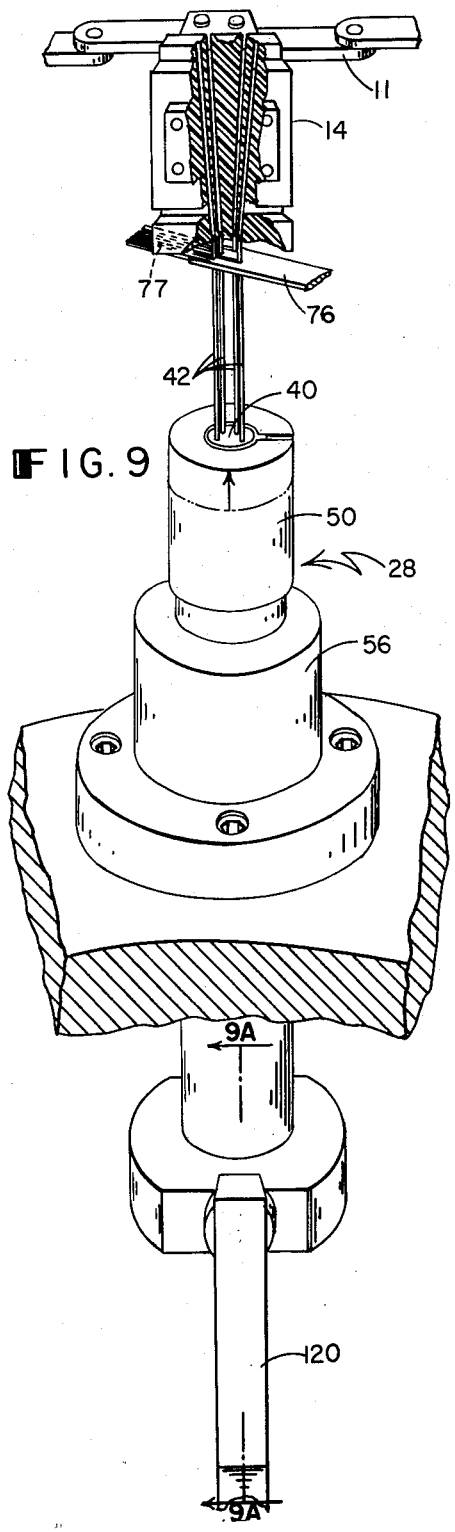
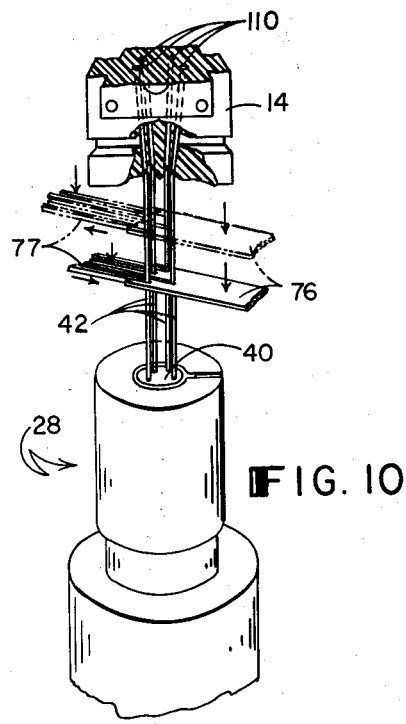
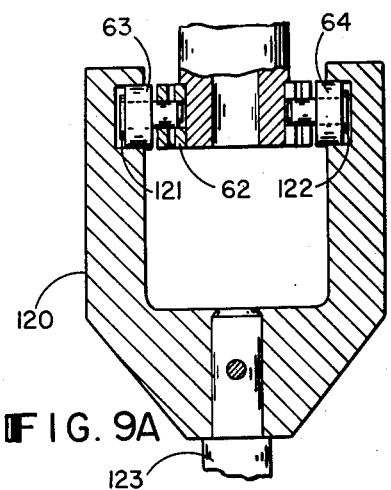
INVENTOR.
ALFRED S. JANKOWSKI
BY
David M. Keay
AGENT.

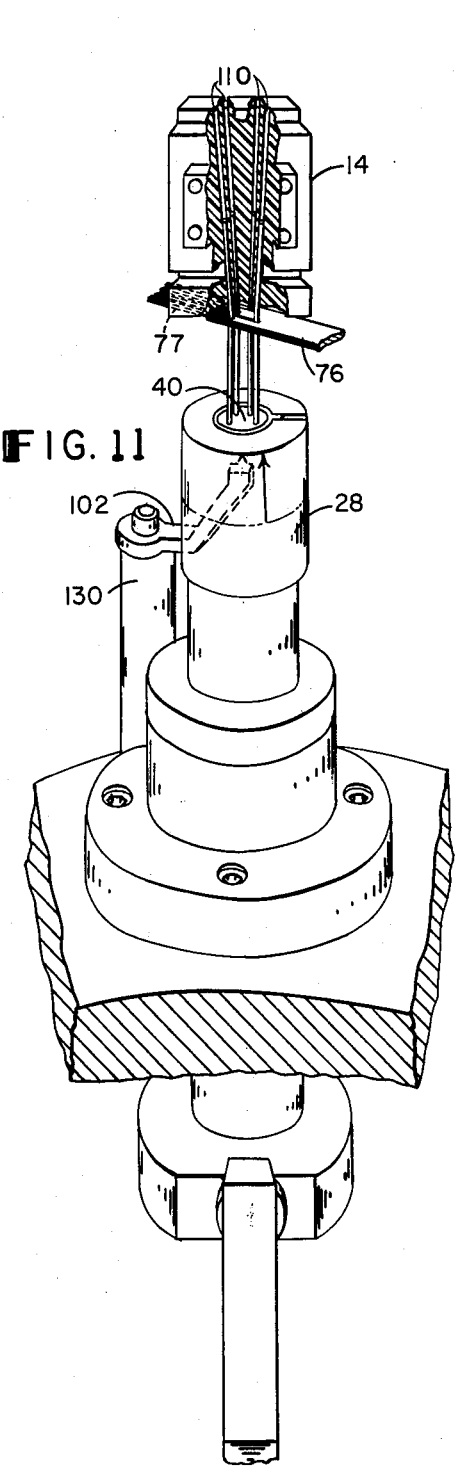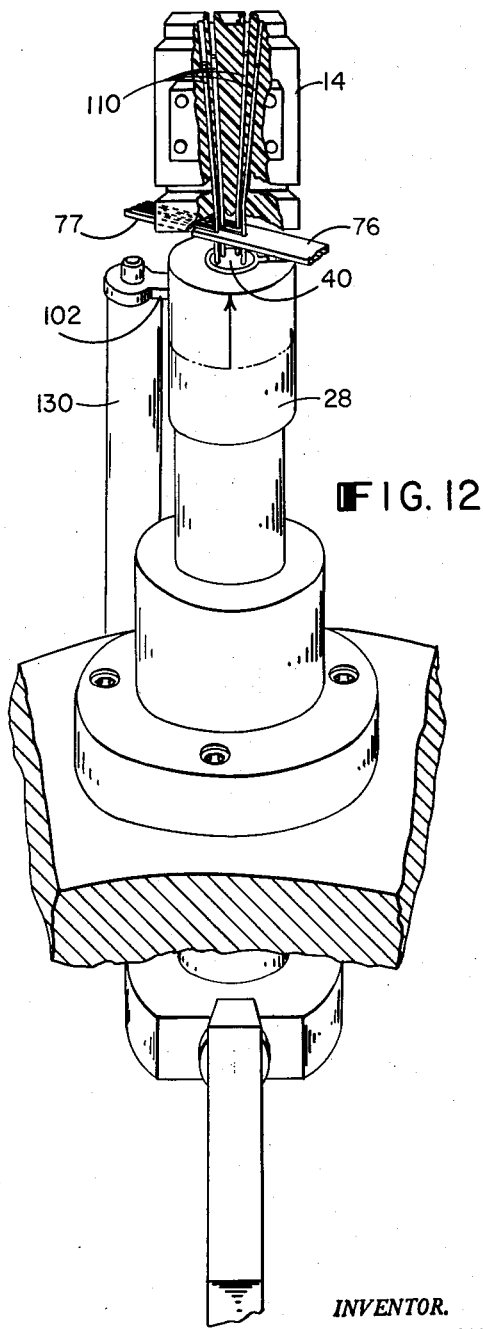

Jan. 29, 1963  A. S. JANKOWSKI  3,075,562
LEAD WIRE INSERTING APPARATUS
Filed Jan. 30, 1961  12 Sheets-Sheet 9
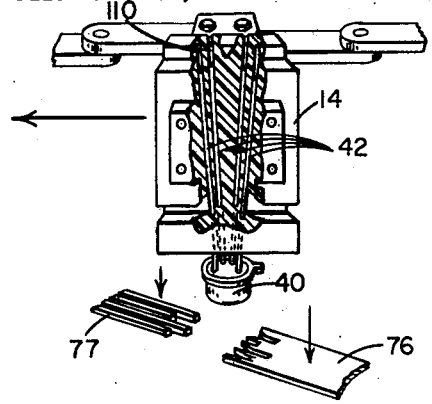
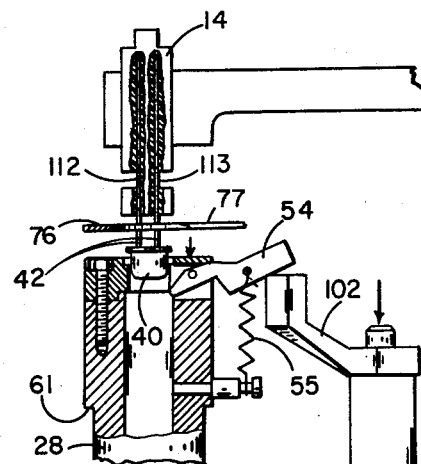
FIG. 13
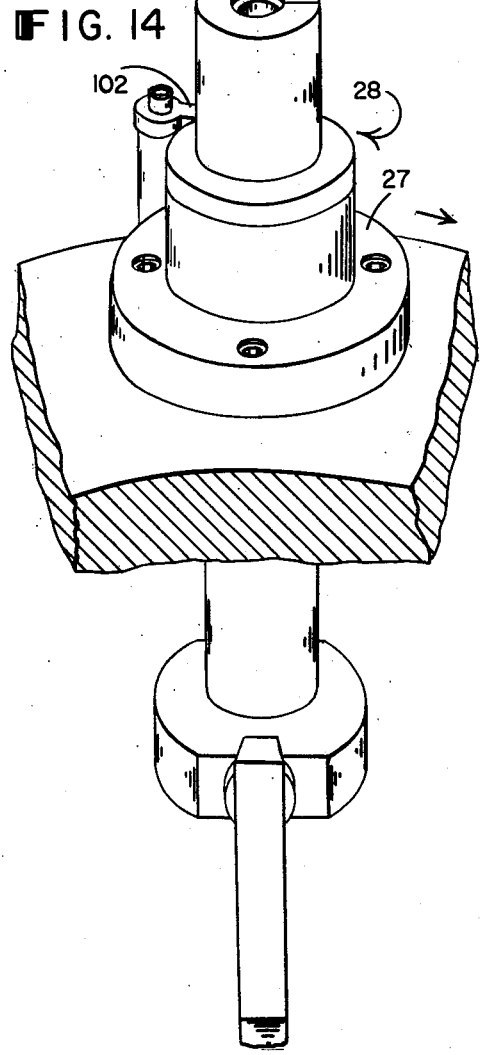
FIG. 14
INVENTOR.
ALFRED S. JANKOWSKI
BY
David M. Keay
AGENT.

Jan. 29, 1963　　A. S. JANKOWSKI　　3,075,562
LEAD WIRE INSERTING APPARATUS

Filed Jan. 30, 1961　　12 Sheets-Sheet 10

INVENTOR.
ALFRED S. JANKOWSKI
BY
David M. Keay
AGENT

Jan. 29, 1963  A. S. JANKOWSKI  3,075,562
LEAD WIRE INSERTING APPARATUS
Filed Jan. 30, 1961  12 Sheets-Sheet 11
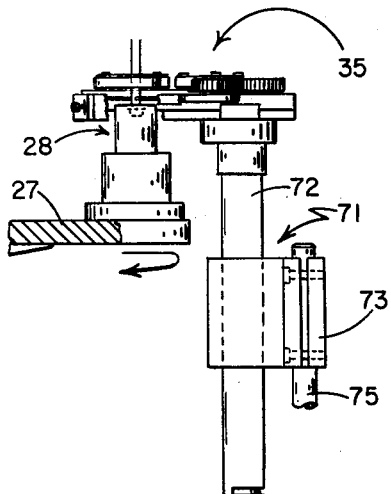
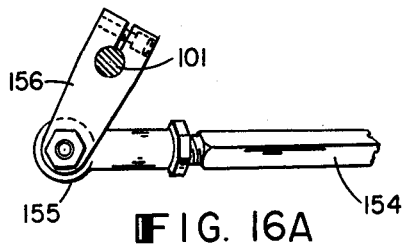
FIG. 16A
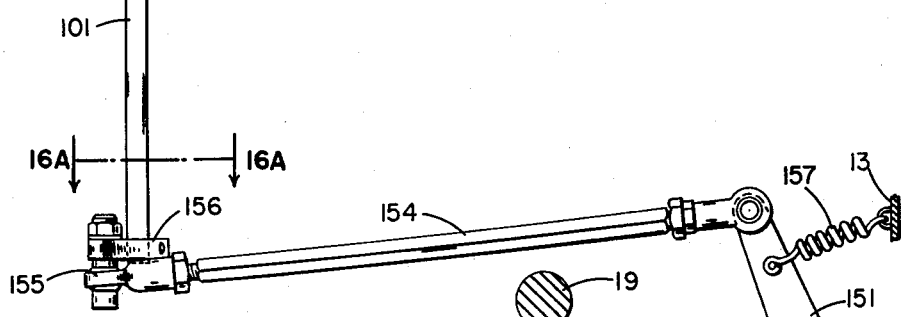
FIG. 16
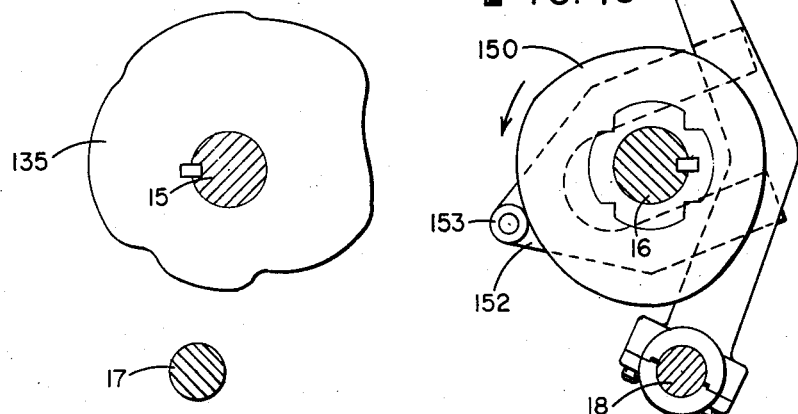
INVENTOR.
ALFRED S. JANKOWSKI
BY
David M. Keay
AGENT.

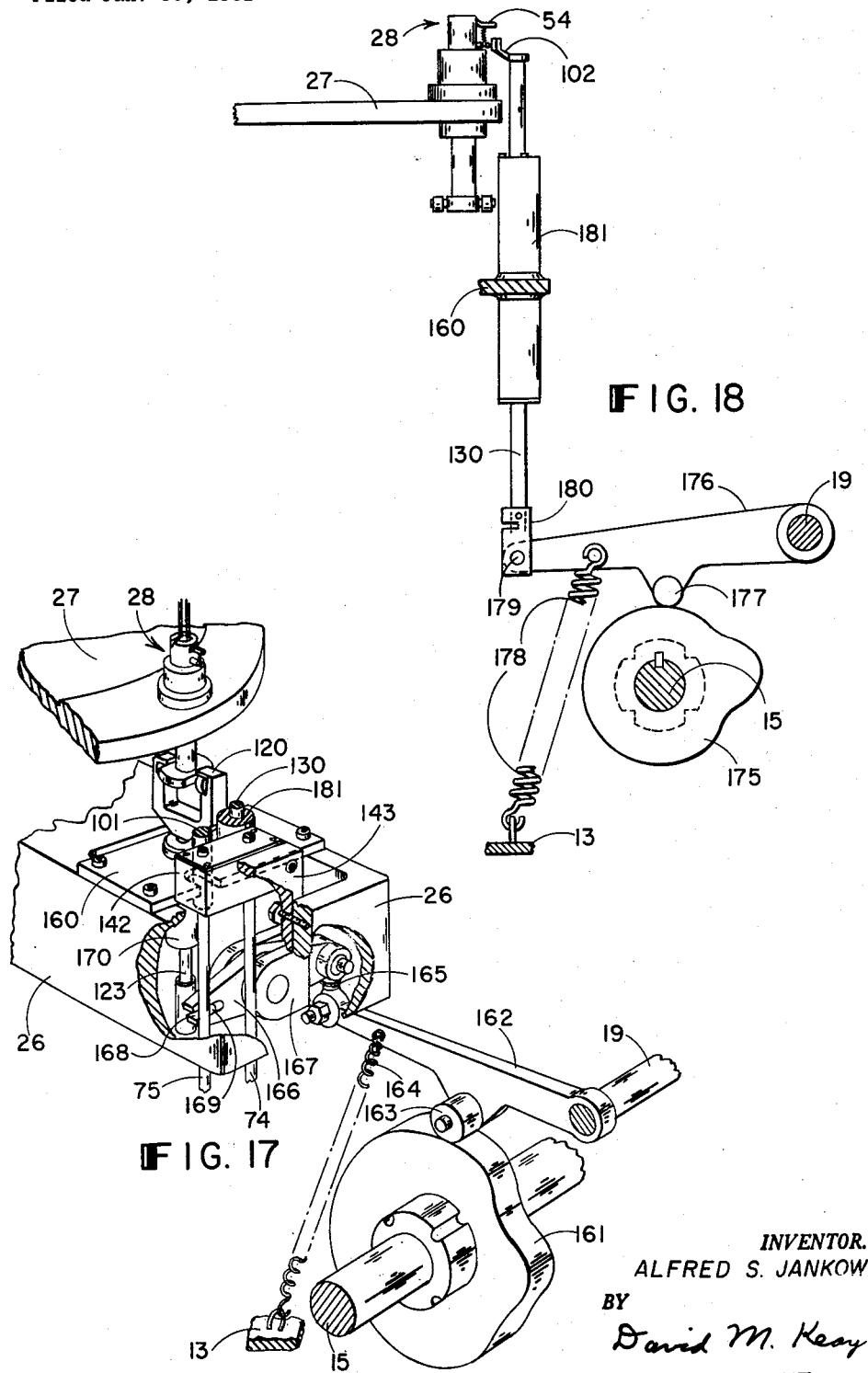

3,075,562
LEAD WIRE INSERTING APPARATUS
Alfred S. Jankowski, Stoneham, Mass., assignor to Sylvania Electric Products Inc., a corporation of Delaware
Filed Jan. 30, 1961, Ser. No. 85,915
5 Claims. (Cl. 140—147)

This invention relates to apparatus for inserting the lead wires of an electrical device in a receptacle. More particularly it is concerned with apparatus for automatically straightening and orienting the lead wires of an electrical device and threading them into openings in a receptacle adapted to receive them.

In the manufacture of many electrical devices having external lead wires it may be desirable to position the leads in a particular configuration and thread them into a receptacle adapted to receive them in order to accomplish certain manufacturing or testing operations. This problem is particularly significant, for example, in the automatic testing of small multi-lead semi-conductor devices such as transistors.

Transistors generally have three or more external lead wires usually of a soft, flexible metal, and the leads are generally thin and very long in relation to the dimensions of the remainder of the device. During the fabrication processes, the transistors are handled many times and the leads inevitably become bent, twisted, and intertwined. After each transistor is assembled, the leads must be separated and individually identified in order to apply contacts for conducting electrical tests on the transistor. This procedure is generally performed manually by the test operator while she makes the electrical connections to the leads for testing.

When electrical testing of transistors is performed automatically on high speed automatic testing apparatus, manual straightening, orienting, and contacting of the leads is entirely impractical. One form of automatic testing apparatus is described in a co-pending application entitled "Testing and Sorting Apparatus," Serial Number 807,550, filed April 20, 1959, now Patent No. 3,032,191 in the name of Rodney W. Clukey and assigned to the assignee of the present invention. This apparatus employs a conveyor arrangement which indexes periodically to move each of a plurality of carriers from one station of a plurality of test stations to the next in series. Each carrier is adapted to hold one device to be tested in such a manner as to enable proper electrical contact to be made to each lead of the device at each test station. Upon completion of the testing, the device is removed from the carrier and automatically deposited at a particular one of several sorting locations, depending upon the results of the tests. The particular carrier shown by way of example in the Clukey application is adapted for handling devices having two coaxial leads. With devices of this type the leads remain separated and are fairly readily identifiable and accessible for making contact thereto at each test station. When testing devices having more complicated lead configurations, such as transistors, in automatic apparatus of the type disclosed in the Clukey application, each carrier must be adapted to hold a device with each of the leads located at a fixed position with respect to the others so as to be individually and uniquely accessible for enabling contact to be made thereto automatically at each test station.

One form of carrier which provides for holding the leads so as to make testing at a series of test stations possible is a receptacle having a plurality of openings, one for each of the leads. Threading the leads into the proper openings places them in a fixed configuration which they maintain during the entire testing operation. However, because of the aforementioned problem of three or more bent and twisted leads, arranging the leads of a transistor into the same orientation as the openings in the carrier and inserting the leads in the openings during the dwell period of a high speed automatic conveyor presents difficulties not encountered when handling simpler electrical devices.

It is an object of the invention, therefore, to provide apparatus for inserting the lead wires of an electrical device in a receptacle.

It is a more specific object of the invention to provide apparatus for automatically straightening and orienting the lead wires of a transistor and threading them into openings in a receptacle adapted to receive them.

Briefly, in accordance with the foregoing objects, apparatus according to the invention includes orienting means for confining a portion of each of the leads of an electrical device. The orienting means is then caused to travel along the length of the leads so as to confine the portions of the leads adjacent their ends aligned with openings in a receptacle adapted to receive the leads. Relative movement between the device and the receptacle then causes the leads to be inserted into their respective openings in the receptacle.

It is a feature of the invention to provide a set of combs which are adapted to be interdigitated for confining a portion of each of the leads of a device and orienting them in a desired configuration.

It is another feature of the invention to provide actuating means for advancing the combs toward each other in order to interdigitate the combs and encircle the leads at portions thereof adjacent the body of the device.

It is also a feature of the invention to provide a holder for each electrical device. The holder is moved into position at an inserting station at which is located the set of combs and a receptacle having openings adapted for receiving the leads of the device.

It is a further feature of the invention to provide actuating means for obtaining relative movement of the set of combs and the holder with respect to each other and with respect to the receptacle thereby straightening and orienting the leads of the device and inserting them in the appropriate openings in the receptacle.

Additional objects, features, and advantages of apparatus according to the invention will be apparent from the following detailed discussion and the accompanying drawings wherein:

FIG. 5 is an elevational view of the lead straightening and orienting mechanism or comb assembly taken in section along the line 5—5 of FIG. 3 and showing a transistor and a portion of a holder in position between the combs;

FIG. 6 is a timing chart which indicates graphically the action of portions of the apparatus continuously throughout one complete operating cycle in which a transistor is placed in a carrier;

FIGS. 7 through 14 illustrate the position of portions of the apparatus at the inserting station during various stages throughout one operating cycle;

FIG. 16 is an elevational view of the cam and linkage arrangement for actuating the comb advancing and retracting mechanism of the comb assembly;

FIG. 16A is a plan view of a detail of the cam and linkage arrangement of FIG. 16 taken in section along the line 16A—16A of FIG. 16;

FIG. 17 is a perspective view showing the mechanism for raising and lowering a transistor holder of the auxiliary turret when the holder is in position at the inserting station, and also showing the location of the supporting bearings for the various inserting station actuating mechanisms on the base member of the auxiliary turret; and FIG. 18 is an elevational view of the mechanism for releasing the locking lever which grips the transistor in the holder in order that the transistor can be removed from the holder after the leads of the transistor have been inserted into the openings in the carrier.

General Description

Figure 1:
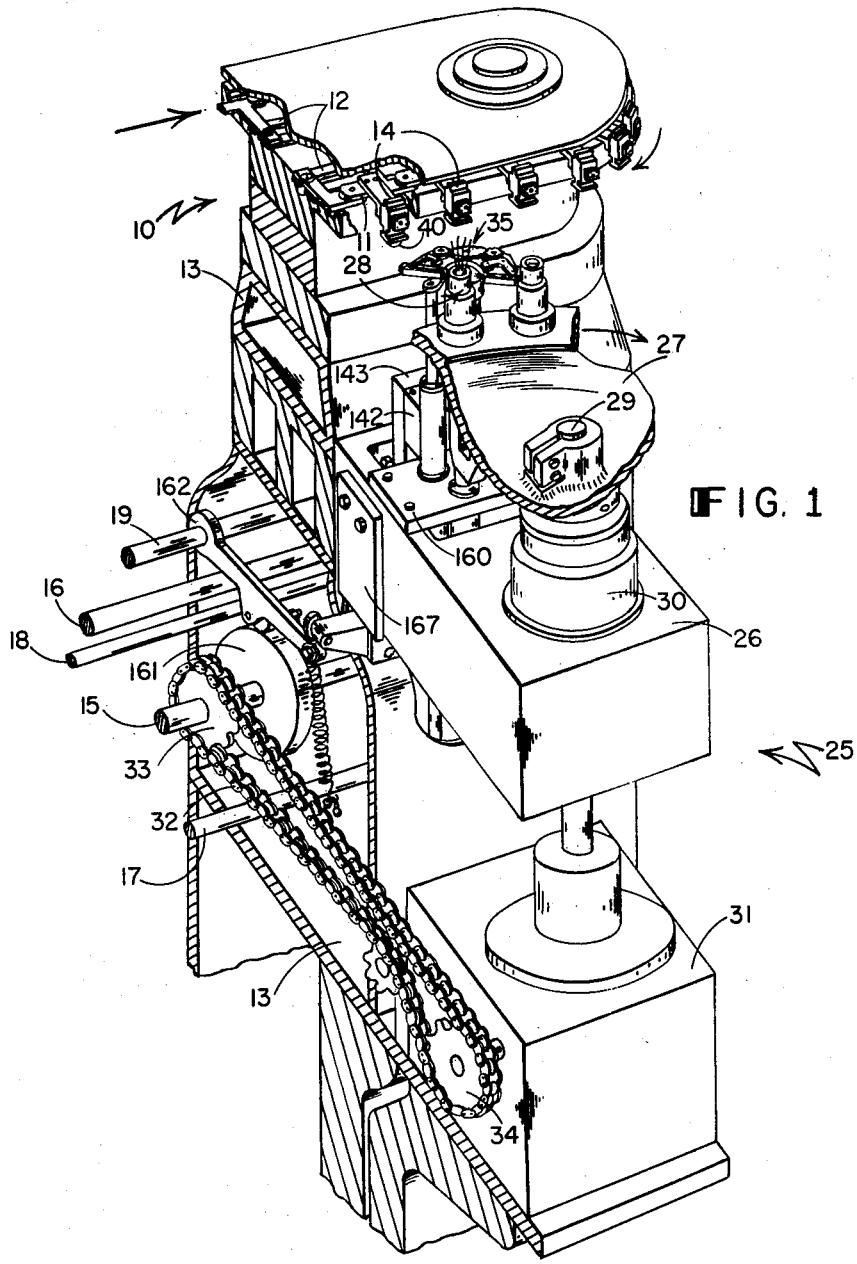
FIG. 1 is an elevational view in perspective showing in cross section portions of a chain type conveyor having carriers for moving transistors through a series of test stations, an auxiliary turret for bringing transistors into position adjacent the carriers at an inserting station, and lead wire inserting apparatus according to the invention for placing the transistors in the carriers.

Illustratively, apparatus according to the invention is employed in conjunction with a chain type conveyor 10, portions of which are shown in FIG. 1. A continuous chain 11 is supported in a track 12 on the conveyor chassis 13. A plurality of carriers 14 are mounted to the links of the chain at equal intervals along the chain. Each carrier has openings in its bottom surface for receiving the lead wires of a transistor. The chain is driven by a suitable driving means (not shown) through a continuous series of operating cycles, each of which includes a dwell period and an index or transfer period. During a dwell period each carrier of the conveyor remains stationary at a position along the path of the conveyor chain. During a transfer period the conveyor indexes in the direction indicated by the arrows and each carrier is moved from one position to the next in sequence, a distance equal to the distance between the carriers. The conveyor has a first cam shaft 15 which rotates in a counterclockwise direction as viewed in FIG. 1. The cam shaft is driven by a driving mechanism (not shown) synchronized with the chain driving means and rotates continually at a constant rate of speed, making exactly one complete revolution during each operating cycle of the conveyor. A second cam shaft 16 is driven similarly to the first cam shaft but rotates in a clockwise direction as viewed in FIG. 1. Three stationary shafts 17, 18, and 19 which are parallel to the cam shafts provide pivot points for various levers and arms of mechanisms which are actuated by cams attached to the cam shafts.

An auxiliary turret 25 is mounted to the chassis 13 of the conveyor by means of a base member 26. The turret includes a circular plate 27 (only a portion of which is shown in FIG. 1) having a plurality of holders 28 for supporting transistors mounted at equal intervals about its periphery. The turret plate is clamped to a shaft 29 which passes through a bearing 30 to an indexing drive mechanism 31. The indexing drive mechanism is supported by the chassis of the conveyor and is driven continuously by a chain 32 between a sprocket wheel 33 mounted to the first cam shaft 15 of the conveyor and a sprocket wheel 34 of the indexing drive mechanism. The continuous rotation of the sprocket wheel is converted by the indexing drive mechanism so as to provide operating cycles of alternating dwell and transfer periods of the turret plate 27. During each transfer period the holders move from one position to the next in sequence. The operating cycles of the auxiliary turret and the main conveyor are substantially the same and they are automatically synchronized by the chain drive from the main conveyor cam shaft to the auxiliary turret.

The chain conveyor 10 and the auxiliary turret 25 are positioned with respect to each other so as to establish an inserting station which includes a position occupied by a carrier 14 and a position occupied by a transistor holder 28. The position of the holder at the station is directly below the position of the carrier. A transistor which is carried to the station in a holder is removed from the holder and placed in the carrier in order that it may be tested at the various testing stations (not shown) arranged at carrier positions farther along the conveyor. Located at the inserting station is a lead straightening and orienting mechanism 35 and other elements of the apparatus for properly placing the transistor in the carrier with each of its leads in an appropriate opening as will be explained in detail hereinafter.

An example of a chain conveyor of the type described has 80 carriers at 80 equally spaced positions. The auxiliary turret has 12 holders at 12 equally spaced positions. The time for one complete operating cycle is 2.0 seconds which is divided into a transfer period of .5 second and a dwell period of 1.5 seconds. Thus 1800 transistors are processed by the equipment in an hour.

Apparatus at the Inserting Station

Figure 2:
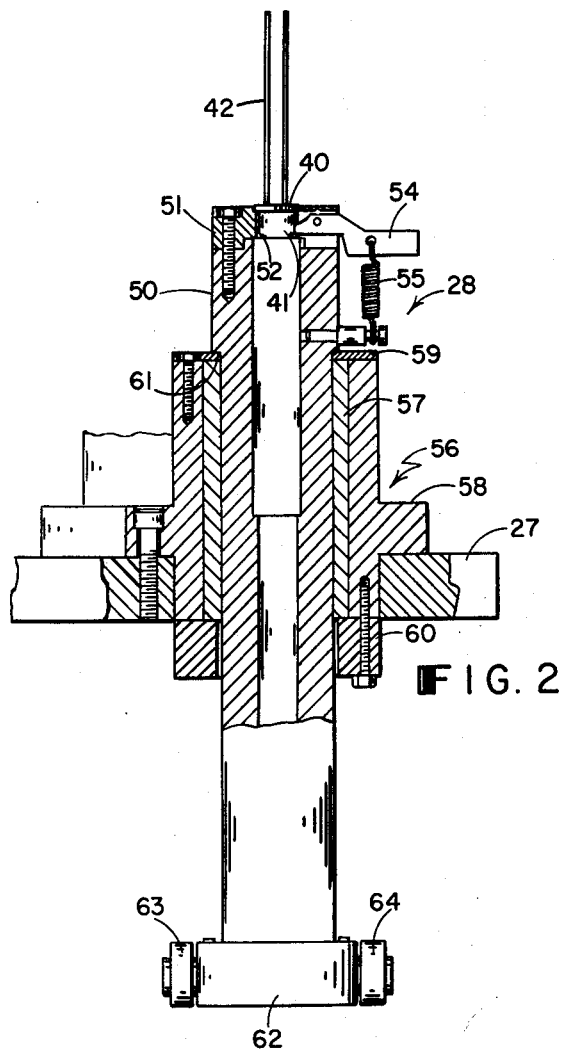
FIG. 2 is an elevational view in cross section through a portion of the auxiliary turret of FIG. 1 showing the details of a transistor holder mounted on the turret.
Figure 3:
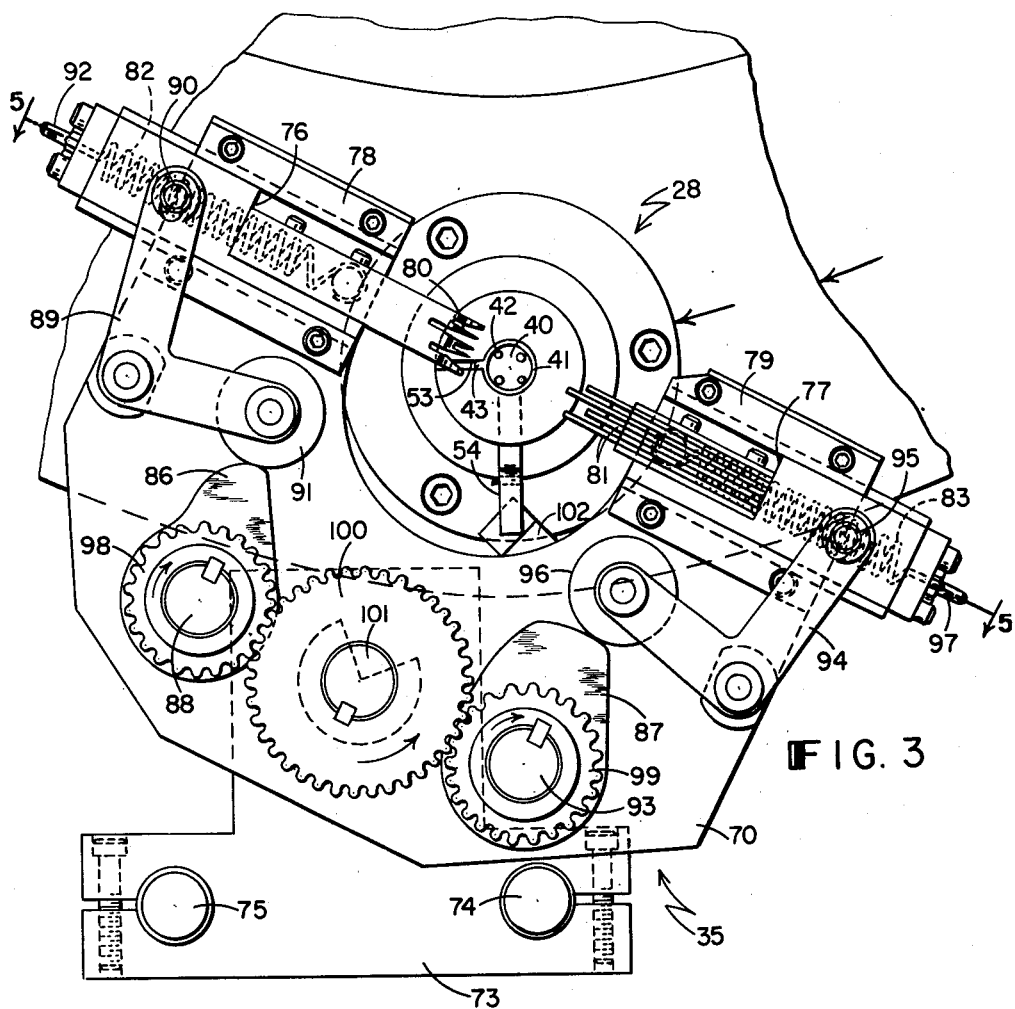
FIG. 3 is a plan view showing the transistor lead straightening and orienting mechanism including the set of combs for encircling the transistor leads and the mechanism for advancing and retracting the combs, and also showing a transistor holder and transistor in position between the retracted combs.

A portion of the auxiliary turret plate 27 on which the transistor holder 28 is mounted is shown in detail in FIG. 2. A transistor 40 which is of a standard size and shape is shown in position in the holder. The transistor includes a generally cylindrical body or case 41 which contains the electrically active elements of the device and has four leads 42, as can best be seen in FIG. 3, which emerge from a generally planar surface of the body and extend parallel to each other. At the surface of the body the leads are spaced at equal intervals in a circular array. A projection or tab 43 on the periphery of the body midway between two of the leads serves to provide a reference point for identifying each lead as to its internal connections. In clockwise order around the transistor from the tab as shown in FIG. 3 the leads are to the emitter, base, collector, and case or body. Very commonly the lead to the body of the transistor is eliminated, thus providing a three lead wire device.

The holder 28 includes a cylindrical body 50 which extends above and below the turret plate 27. An adapter 51 having an opening 52 for receiving the body of a transistor 40 is mounted on top of the holder body. The tab 43 of the transistor fits into a groove or depression 53 in the upper surface of the adapter as shown in FIG. 3 in order to fix the orientation of the transistor body and also its leads at the point they emerge from the transistor body. The groove lies perpendicular to the diameter of the turret plate passing through the center of the holder and the transistor. A locking lever 54 is pivoted in an opening in the side of the adapter and is urged into position for firmly locking the transistor in the holder by a tension spring 55. The transistor is unlocked to permit release from the holder by upward movement of the outer end of lever against the force of the spring.

The holder body 50 is slidably mounted in a supporting bearing 56 which includes a sleeve 57 supported in the turret plate by means of a collar 58 and plate 59 on the upper surface of the turret plate and a retaining ring 60 attached to the bottom surface of the collar. Downward movement of the holder is limited by a shoulder 61 in the holder body. A ring 62 having two rollers 63 and 64, the purpose for which will be explained hereinafter, attached to it is secured to the lower end of the holder body.

The lead straightening and orienting mechanism or comb assembly of the inserting station is shown in detail in FIGS. 3 and 5. A transistor holder 28 and a transistor 40 are shown in position at the station. The mechanism has a crescent shaped base plate 70 which is securely attached to a support 71 including a hollow sleeve 72 fastened to a mounting block 73. Two rods 74 and 75 are fixed to the mounting block. The rods are moved vertically by a means to be described hereinafter in order to raise and lower the entire comb assembly. Two combs 76 and 77 are slidably mounted in guides 78 and 79 which are fastened to the base plate so as to permit movement of the combs directly toward and away from each other and the transistor in position at the station. The direction of movement of the combs is set at an angle of 63° from the diameter of the turret plate passing through the center of the holder. Thus, when the leads of the transistor are viewed along the direction of movement of the combs, they are spaced apart at equal intervals.

The first or female comb 76 has four slots along its direction of movement which are formed by the fingers 80 of the comb. The slots are slightly wider than the diameter of the leads and are spaced at equal intervals conforming to the equal spacing of the leads as viewed along the direction of movement of the combs. The amount of travel of the comb and the depth of the slots are such as to place each of the leads adjacent the end of its slot upon full advance of the comb as can best be seen in FIG. 4.

Figure 4:
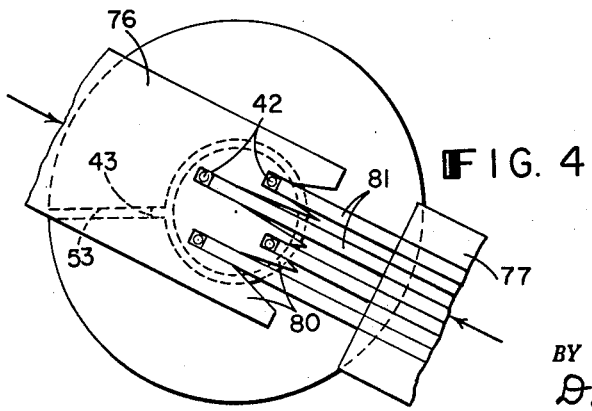
FIG. 4 is an enlarged plan view of portions of the set of combs and a transistor with the combs in the advanced position encircling the leads of the transistor.

The second or male comb 77 has four teeth or fingers 81 which are slightly narrower than the slots in the first comb and are spaced apart so as to mate with the slots in the first comb. The amount of travel of the second comb and the length of each of the fingers are such as to form, in combination with the fingers of the first comb, small openings conforming to the configuration of the transistor leads for individually confining each of the leads upon full advance of both combs as shown in FIG. 4. When one standard type of transistor having leads of .017 inch diameter is being handled, the fully advanced interdigitated combs provide openings of approximately .020 inch square.

The fingers of the first comb 76 are tapered at their ends in both the horizontal and the vertical planes. Since the comb is spaced only slightly above the transistor body as shown in FIG. 5, as it is advanced, the configuration of the fingers guides the leads into the proper slots even though the leads are bent and twisted. The second comb 77 then insures that the leads are positioned at the ends of slots and are confined in a pattern conforming to their pattern at the body of the transistor.

The combs are fed toward each other into the advanced position by the action of tension springs 82 and 83 fastened to the rearward portions of the female and male combs 76 and 77, respectively, and attached to the base plate 70 near the forward ends of the combs by pins 84 and 85, respectively. The combs are permitted to advance or are retracted by rotation of comb cams 86 and 87. The female comb cam 86 for advancing and retracting the female comb 76 is attached to a rotatable shaft 88 mounted to the base 70. A rocker arm 89 mounted to the base plate at a pivot has one end attached to the female comb through a slot and pin arrangement 90. The other end of the rocker arm carries a cam follower 91 which bears against the surface of the female comb cam. Clockwise movement of the cam from the position shown in FIG. 3 permits the female comb to be advanced toward the transistor under the action of the tension spring. The location of the comb in the fully advanced position is determined by the position of the adjustable stop 92 at the rear of the comb.

The male comb cam 87 for advancing and retracting the male comb 77 is attached to another rotatable shaft 93, mounted in the base plate. A rocker arm 94 is pivotally mounted to the base plate and one end of the rocker arm is attached to the male comb through a slot and pin arrangement 95. A cam follower 96 at the other end of the rocker arm bears against the surface of the cam. Rotation of the male comb cam 87 in the clockwise direction from the position shown in FIG. 3 permits the male comb to be advanced toward the transistor under the action of the tension spring. The location of the comb in the fully advanced position is determined by the position of the adjustable stop 97 at the rear of the comb.

The female and male comb cams 86 and 87 are rotated by rotation of gears 98 and 99 which are also fixed to the cam shafts 88 and 93, respectively. These gears are driven by a driving gear 100 fastened to a comb feed shaft 101 which passes upward through the sleeve 72 supporting the base plate 70. The comb feed shaft is rotated in a counterclockwise direction through an angle of about 60° from its position as shown in FIG. 3 in a manner to be explained hereinafter. This action rotates each of the driven gears 98 and 99 through angles of about 90°. As the comb cams are rotated, the configurations of the cam surfaces causes the female comb 76 to be fed into position toward the transistor first. The tapered portions of the comb fingers pass between the transistor leads very close to the transistor body and guide each lead into its appropriate slot in the comb. The male comb cam 87 then permits the male comb 77 to advance, and the fingers of the comb confine the transistor leads adjacent the ends of the slots in the female comb. Rotation of the comb feed shaft 101 and driving gear 100 in the clockwise direction rotates the comb cams in the counterclockwise direction feeding the combs outward against the action of the comb springs.

Located at the inserting station as can be seen in FIG. 3 is a release arm 102 for permitting the transistor to be removed from the holder at the appropriate time. This arm is moved upward against the underside of the locking lever 54 in the holder to unlock the transistor from the gripping action of the lever. Its purpose and manner of operation will be explained in more detail hereinafter.

Also located at the inserting station is an empty carrier 14 to which the transistor in the holder is to be transferred. The details of a carrier may be seen in FIGS. 7 and 8. Four passages 110 in the body of the carrier terminate in openings 111 at the bottom of the carrier. The openings are arranged in the pattern of the transistor leads as they emerge from the transistor body, and the position of the carrier with respect to the transistor holder is such that each opening is directly above its intended lead at the point the leads emerge from the transistor body. The passages are slightly larger than the diameter of the leads and the openings may be enlarged by countersinking. The passages diverge (toward the right and the left as viewed in FIGS. 7 and 8) as the distance from the openings increases. Thus, when the leads of a transistor are inserted through the openings and up into the passages, friction between the leads and the walls of the passages supports the transistor in the carrier. The body of the carrier is made of an insulating material such as, for example, Teflon in order that the transistor leads will remain insulated from each other electrically. Two grooves 112 and 113 in the body of the carrier, as can best be seen in FIG. 13, are only sufficiently deep to expose portions of the transistor leads so that contacts can be applied to them at each testing station along the main conveyor.

*Operation of Apparatus at the Inserting Station*

The manner in which the transistor holder 28, lead straightening and orienting mechanism 35, and locking lever release cooperate to place a transistor in a carrier 14 with the leads inserted in the proper openings can best be understood by the following discussion of FIGS. 7 through 14 in conjunction with the timing chart of FIG. 6. In the chart of FIG. 6 the action of various elements of the apparatus are indicated graphically for one complete operating cycle. The horizontal scale of the chart is in degrees as a measure of the elapsed time from the start of a cycle so as to bear a direct relationship to the angle of rotation of the main conveyor cam shafts which actuate the apparatus at the inserting station as will be explained in detail hereinafter.

FIG. 7 shows portions of the apparatus as viewed from the center of the turret plate 27 after an index or transfer period has been completed. An empty carrier 14 is positioned by the conveyor chain 11 at the inserting station and a holder 28 with a properly oriented transistor 40 is also located at the inserting station. In order that the actions of the various elements of apparatus may be more readily understood, only portions of the combs 76 and 77 are shown rather than the entire comb assembly. The combs are shown in the position they occupy at about 105° of the operating cycle. The comb assembly is not lowered to place the combs in the position shown until shortly after the auxiliary turret has completed its movement, which is complete at 90°, in order that the transistor holders will clear the lowermost portions of the comb assembly.

The combs are fed in toward the transistor by the comb advancing and retracting mechanism in the manner explained previously. The tapered fingers of the female comb 76 pass between the transistor leads closely adjacent the transistor body and guide the leads into the slots between each set of two fingers. The fingers of the male comb 77 feed into the slots in the female comb after the female comb has been advanced to its position. Thus, the leads are each individually encircled and confined for a portion of their length adjacent the transistor body as illustrated in FIG. 4. The advancing action of the combs starts at 90°, when the holder reaches its position at the inserting station, and continues until the transistor leads are confined into the configuration of the leads as they emerge from the transistor body at about 160° of the cycle.

After the transistor leads have been encircled by the fingers of the combs, the entire comb assembly is raised in order to move the combs to the height shown in FIG. 8 at about 190°. The action of the combs travelling upward along the length of the leads while the transistor is locked in the holder forces each portion of the leads to conform to the orientation of the openings established by the interdigitated combs. The leads are thus straightened from their twisted configuration, such as illustrated in FIG. 7, and the ends of the leads are arranged in the orientation of the leads at the transistor body. The ends of the leads are, therefore, in line with the openings in the carrier.

The comb mechanism continues to be raised beyond the 190° position shown in FIG. 8, and starting at 190° the transistor holder is also raised at the same rate. As shown in FIGS. 9 and 9A (FIG. 9A is a cross-section view taken along the line 9A—9A of FIG. 9), the transistor holder is raised by the upward movement of a yoke 120 acting on the lifting rollers 63 and 64 which are mounted at the lower part of the holder body. The rollers move into position in the slots 121 and 122 in the yoke as the auxiliary turret brings the holder into position at the inserting station at the termination of the index period of the cycle. The yoke is connected to a rod 123 which is raised and lowered by an actuating means to be described in detail hereinafter. As explained previously, the body 50 of the transistor holder slides up and down in a bearing 56 which is shown in detail in FIG. 2. The transistor holder 28 and the comb assembly are raised together through the same distance from 190° to 205°. At 205° as shown in FIG. 9 the ends of the leads 42 are threaded a short distance into the openings 111 in the carrier 14.

During the next portion of the cycle the transistor holder remains stationary with the ends of the transistor leads inserted in the openings in the carrier and held in proper orientation thereby. The male comb is retracted slightly from the leads and then the comb assembly is lowered. This action of the combs is illustrated by the showing of the combs in phantom in FIG. 10. The comb assembly is lowered so as to position the combs about midway along the transistor leads between the carrier and transistor holder. Then the combs are fed in to encircle and confine the leads as shown in FIG. 10, which illustrates the position of the elements of the apparatus at about 235° of the cycle. The transistor holder and the comb assembly are then raised together, thus threading the transistor leads farther into the passages in the carrier. During this step the combs support portions of the leads intermediate the ends in the proper orientation and thus help to prevent buckling of the leads.

Starting at about 235° the locking lever release arm 102 is also moved upward. The arm is fixed to a supporting rod 130 which is raised by a means to be explained in more detail hereinafter. As can be seen in the figures the passages 110 in the carrier diverge as the distance from the bottom of the carrier increases. At the bottom of the carrier the openings 111 are of the same configuration as the transistor leads at the body of the transistor. As the transistor is moved upward, however, the ends of the leads are gradually forced farther apart as can be seen in FIG. 11. The combs reach their maximum height at about 255° as shown in FIG. 11, but both the transistor holder 28 and the locking lever release arm 102 continue to be moved upward.

FIG. 12 shows the elements of the apparatus at about 275° when the holder and the release arm have also attained their farthest upward position. The transistor leads have been inserted farther into the diverging passages in the carrier. The locking lever release arm has been raised a distance from its lowermost position which is slightly greater than the total distance the transistor holder has been raised. Thus, the arm forces the locking lever 54 on the holder upward against the action of the spring 55. The results of this action can best be seen in FIG. 13 which shows the elements slightly after 280° when downward movement of the holder 28 and release arm 102 have been started. The locking lever 54 has released its grip on the transistor 40 so that as the holder is lowered, the transistor remains suspended in the carrier by its divergent leads.

The transistor holder 28 and release arm 102 continue to be lowered; then the combs are retracted and the comb assembly lowered. The sequence of these actions is illustrated graphically in the timing chart of FIG. 6. At the completion of the cycle (360°) before the turret and the main conveyor index, the elements are in the positions shown in FIG. 14. The transistor holder and locking lever release arm are fully lowered to their original positions, but the combs, which have been completely retracted, have been lowered only partially so that the transistor holder will clear the lower portion of the comb assembly during movement of the turret during the transfer period as has been explained hereinabove. The transistor is in position in the carrier, held by friction between the leads which have been threaded well into the carrier passages and the walls of the passages. The carrier and the turret are then ready to be moved during the index period of the subsequent operating cycle, which brings the next transistor holder with a transistor and the next empty carrier into position at the inserting station.

*Actuating Mechanisms for Apparatus at the Inserting Station*

The comb assembly is raised and lowered, the combs are advanced and retracted, the transistor holder is raised and lowered, and the locking lever release is raised and lowered by means of mechanisms driven by cams attached to the continuously rotating cam shafts 15 and 16 shown in FIG. 1. It is the configurations of the cam surfaces which establish the proper sequence of operations illustrated graphically in FIG. 6.

Figure 15:
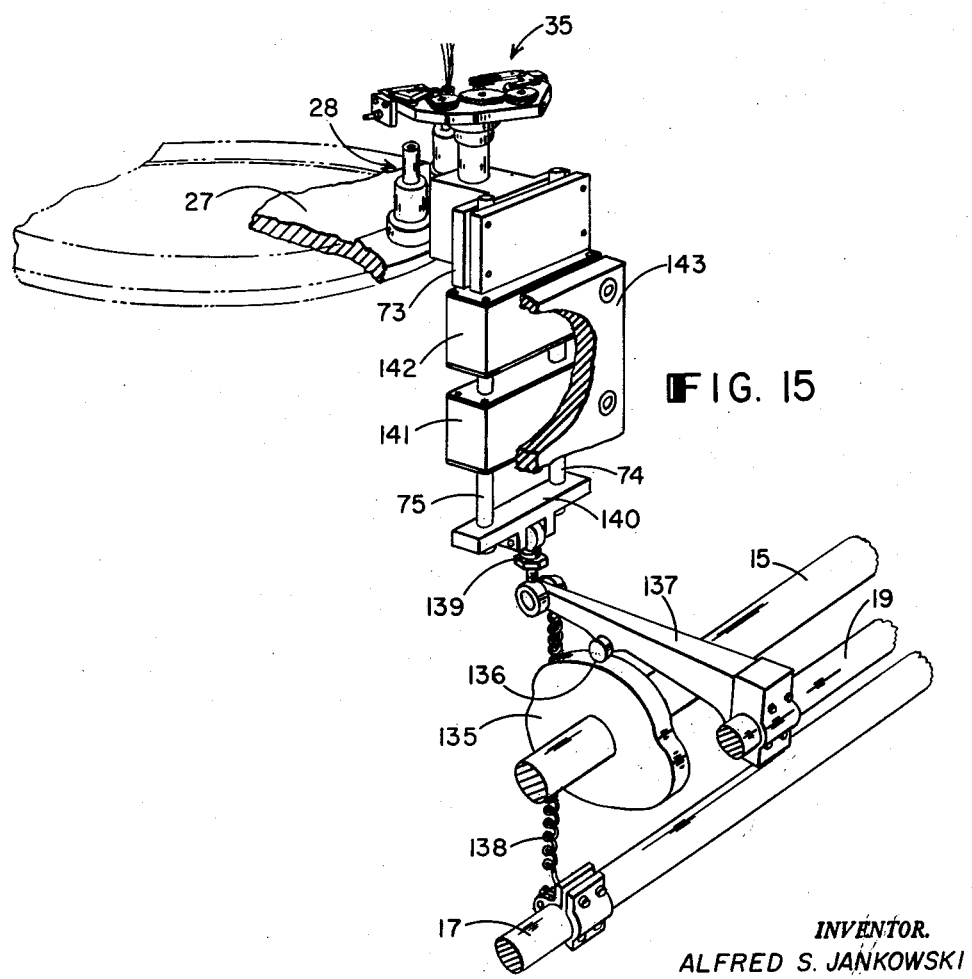
FIG. 15 is a perspective view of the mechanism for raising and lowering the lead straightening and orienting mechanism or comb assembly at the inserting station.

The mechanism for raising and lowering the comb assembly 35 is shown in FIG. 15. A cam 135 is mounted on the first continuously rotating cam shaft 15 which rotates in the clockwise direction as viewed in FIG. 15. The cam surface bears against a cam follower 136 on a lever arm 137 which is pivotally mounted on one end to a stationary shaft 19. The cam follower 136 is urged against the cam surface by a tension spring 138 fastened between the other end of the lever arm and a stationary shaft 17. An adjustable link 139 is pivotally mounted to the end of the lever arm and to a clevis 140. The lowermost portion of the rods 74 and 75 to which the mounting block 73 for the comb assembly is attached are secured to the clevis. The rods 74 and 75 pass through bearing blocks 141 and 142 which are fastened to a mounting plate 143. The mounting plate is fixed to the base member 26 of the auxiliary turret as illustrated in FIG. 17. Rotation of the cam 135 by the cam shaft 15 thus causes the comb assembly to be raised and lowered as determined by the configuration of the cam surface.

FIG. 16 illustrates the mechanism for rotating the comb feed shaft 101 which drives the comb feed mechanism for advancing and retracting the combs as previously explained in conjunction with the discussion of FIGS. 3 and 5. The mechanism includes a cam 150 fastened to the second cam shaft 16 which is continuously rotating in a counterclockwise direction as viewed in FIG. 16. The first cam shaft 15 and the cam 135 for raising and lowering the comb assembly are also shown in the figure together with the stationary shafts 17, 18, and 19 of the main conveyor in order to illustrate their relative positions. An arm 151 pivotally mounted to a stationary shaft 18 has a yoke member 152 which passes around the cam shaft and supports a cam follower 153. The cam follower is urged against the cam surface by a tension spring 157 connected from the arm to the chassis 13 of the main conveyor. An adjustable rod 154 is pivotally connected to the end of the arm. The other end of the rod is attached to a spherical bearing 155 which in turn is pivotally mounted to a short link 156. As can best be seen in FIG. 16A the end of the link is securely fastened to the comb feed shaft 101. The shaft passes upward through the sleeve 72 of the comb assembly support 71 and is attached to the driving gear 100 of the comb feed mechanism. The location of the shaft 101 as it passes through the region of the auxiliary turret base member 26 is illustrated in FIG. 17. An opening (shown dotted) is provided in the plate 160 in order to permit the shaft to pass through freely. Rotation of the cam 150 causes the arm 151 to be pivoted toward and away from the cam shaft as determined by the configuration of the cam. This action moves the rod 154 back and forth in a direction generally along its length. Acting through the link 156 this motion applies a torque to the comb feed shaft, which is restrained from horizontal movement by the sleeve 72, thus causing rotation of the shaft. Since the entire comb assembly is moved up and down by the comb raising and lowering mechanism, the comb feed shaft 101 also moves up and down. However, the spherical bearing 155 and the pivoted mountings of the linkage elements readily permit the two movements, and the relative dimensions of the various elements are such as to cause negligible rotation of the shaft as a result of its vertical movement.

The mechanism for raising and lowering the transistor holder 28 through the yoke 120 is illustrated in FIG. 17. (Portions of the mechanism are also visible in FIG. 1.) A cam 161 is fastened to the first cam shaft 15 and rotates in the clockwise direction as viewed in the figure. A lever arm 162 is pivotally mounted at one end to a stationary shaft 19 and has a cam follower 163 which is urged against the cam surface by a tension spring 164 connected between the arm and the chassis 13 of the main conveyor. The other end of the lever arm 162 is pivotally connected through a spherical bearing 165 to one end of a rocker arm 166. The rocker arm is pivotally mounted at its center to a mounting bracket 167 which is securely fastened to the base member 26 of the auxiliary turret. The other end of the rocker arm has a slot 168 which receives a pin 169 attached to an extension of the rod 123 on which the yoke 120 is mounted. A support bearing 170 fastened to a plate 160 bolted to the base member 26 supports the rod 123 and prevents its rotation while permitting it to be raised and lowered. The cam 161 causes the yoke to remain in its lowermost position during the indexing portion of an operating cycle so that as a holder 28 is carried into the inserting station by the turret plate 27 the lifting rollers on the holder move into the slots in the yoke. The configuration of the rotating cam 161 acting through the linkages described raises and lowers the yoke, and consequently the holder and the transistor supported in the holder.

Mechanism for raising and lowering the locking lever release arm 102 which tips the locking lever 54 on the transistor holder upward in order to release the transistor and permit removal of the transistor from the holder is illustrated in FIG. 18. A cam 175 is attached to the first cam shaft 15 which rotates in a clockwise direction as viewed in the figure. A lever arm 176 which is pivoted at one end on a stationary shaft 19 has a cam follower 177 which is urged against the cam surface by a tension spring 178. The spring is connected between the arm 176 and the chassis 13 of the main conveyor. The other end of the lever arm is slotted to receive a pin 179 which passes through a clevis 180 at the end of the rod 130 carrying the release arm 102. The rod slides vertically in a supporting bearing which is attached to the plate 160 on the base member 26 as indicated in FIG. 17. Rotation of the cam 175 causes the release arm to be raised and lowered in accordance with the configuration of the cam in order to permit removal of the transistor at the inserting station from the holder at the desired instant in the operating cycle.

What is claimed is:
1. Apparatus for orienting the leads of an electrical device having a plurality of leads with portions passing through a common plane and inserting the leads into a receptacle having openings therein adapted to receive them, said apparatus including two combs adapted to be advanced toward each other and become interdigitated for confining the portions of the leads in a predetermined spaced apart relationship, means for moving the interdigitated combs with respect to the device toward the receptacle whereby successive portions of the leads are confined in the same predetermined spaced apart relationship and the portions of the leads adjacent the ends are positioned in alignment with the openings in the receptacle, and means for providing relative movement between the receptacle and the device to cause the ends of the leads to be inserted in the openings in the receptacle.

2. Apparatus for orienting the leads of an electrical device having a plurality of leads with portions passing through a common plan adjacent the body of the device and inserting the leads into openings in a receptacle; said apparatus including two combs adapted to be advanced toward each other and become interdigitated for confining the portions of the leads in a predetermined spaced apart relationship conforming to the openings in the receptacle; means for moving the interdigitated combs with respect to the device toward the receptacle whereby successive portions of the leads are confined in the same predetermined spaced apart relationship and the portions of the leads adjacent the ends are oriented in a pattern conforming to the openings in the receptacle; and means for providing relative movement between the receptacle and the device, while the portions of said leads adjacent the ends are so held, to insert the leads into the openings in the receptacle.

3. Apparatus for orienting the leads of an electrical device having a plurality of leads emerging from a surface of the body of the device and inserting them into openings in a receptacle, said leads emerging from the surface in spaced apart relationship and extending generally parallel to each other; said apparatus including receptacle supporting means for holding at an inserting station a receptacle having openings adapted to receive the leads of the device, said openings being arranged in a pattern conforming to the pattern of the leads as they emerge from the surface of the body of the device; two combs located at the inserting station, one of said combs having fingers adapted to be interleaved between the leads of the device, the other of said combs having fingers adapted to fit between the fingers of said one comb; comb advancing means for moving said combs toward each other to cause said combs to become interdigitated, the fingers of said interdigitated combs being adapted to encircle portions of the leads adjacent the surface of the body of a device located at the inserting station and arrange the portions of the leads in the same spaced apart relationship as the pattern of the leads emerging from the surface of the body of the device; a holder for supporting a device; positioning means for placing said holder and a device supported thereby at the inserting station; comb raising means for moving the interdigitated combs away from the holder and toward a receptacle held at the inserting station of the receptacle supporting means, while the device remains supported in the holder, whereby successive portions of the leads are confined in said same spaced apart relationship and the portions of the leads adjacent the ends are oriented in a pattern conforming to the pattern of the leads emerging from the surface of the body of the device; and holder raising means for moving the holder and a device supported thereby toward the receptacle, while the portions of the leads adjacent the ends are so confined, to insert the ends of the leads into the openings in the receptacle.

4. Apparatus for orienting the leads of an electrical device and inserting them into openings in a receptacle as in claim 3 including comb repositioning means for removing the combs from the portions of the leads adjacent the ends and positioning said combs to encircle portions of the leads intermediate the surface of the body of the device and the portions adjacent the ends, while the ends of the leads are inserted into the openings in the receptacle; and means for further raising the combs and the holder toward the receptacle, whereby the leads of the device are inserted further into the openings in the receptacle.

5. Apparatus for placing an electrical device having a plurality of leads in a carrier having a plurality of passages for receiving the leads, the leads emerging from a planar surface of the body of the device in spaced apart relationship and extending generally parallel to each other, the passages in the carrier terminating at the bottom surface of the carrier in openings arranged in a pattern conforming to the pattern of the leads emerging from the planar surface of the body of the device and diverging from the pattern in regions of the carrier removed from the bottom surface; said apparatus including carrier conveyor means for positioning a carrier at an inserting station; a holder for supporting a device with the planar surface upward; locking means for preventing movement of a device supported by the holder with respect to the holder; positioning means for placing the holder at the inserting station with the device supported by the holder directly below the carrier located at the inserting station; two combs located at the inserting station, one of said combs having fingers adapted to be interleaved between the leads of the device, the other of said combs having fingers adapted to fit between the fingers of said one comb, said fingers being adapted to provide openings arranged in a pattern conforming to the pattern of the leads emerging from the planar surface of the body of the device when said combs are interdigitated; comb advancing and retracting means for moving the combs toward each other to interdigitate the combs and for moving the combs away from each other; comb raising and lowering means for raising the combs toward the carrier and for lowering the combs away from the carrier; holder raising and lowering means for raising the holder toward the carrier and for lowering the holder away from the carrier; means for actuating the comb advancing and retracting means to move the combs toward each other while the combs are located slightly above the planar surface of the body of the device supported on the holder, whereby the portions of the leads closely adjacent the planar surface are positioned in the openings provided by the fingers of the interdigitated combs; means for actuating the comb raising and lowering means to raise the combs toward the carrier, whereby successive portions of the leads are confined in the same spaced apart relationship and the portions of the leads adjacent the ends are oriented in a pattern conforming to the pattern of the leads emerging from the surface of the body of the device; means for actuating the comb raising and lowering means and the holder raising and lowering means to raise the combs and the device toward the carrier, whereby the ends of the leads are threaded into the openings in the carrier; means for actuating the comb advancing and retracting means and the comb raising and lowering means to position said combs with portions of the leads intermediate the planar surface of the body and the portions adjacent the ends in the openings provided by the interdigitated combs, while the ends of the leads are threaded into the openings in the carrier; means for actuating the comb raising and lowering means and the holder raising and lowering means to raise the combs and the device toward the carrier, whereby the leads of the device are inserted up into the diverging passages of the carrier; releasing means for unlocking said locking means to permit the device to be moved with respect to the holder; means for actuating the comb advancing and retracting means and the comb raising and lowering means for removing the combs from adjacent the device; and means for actuating the holder raising and lowering means to lower the holder away from the carrier, while said releasing means maintain said locking means unlocked, whereby the device is removed from the holder and remains in the carrier suspended by the leads inserted into the diverging passages.

References Cited in the file of this patent

UNITED STATES PATENTS

| 1,760,629 | Brindle | May 27, 1930 |
| 2,120,877 | Uber | June 14, 1938 |
| 2,390,139 | Vasselli | Dec. 4, 1945 |